(12) United States Patent
Kubinski et al.

(10) Patent No.: US 8,737,797 B2
(45) Date of Patent: May 27, 2014

(54) DEVICE FOR RECEIVING A SUBASSEMBLY ASSIGNED TO AN OPTICAL FIBRE CABLE AND FOR FASTENING THE SAME TO A MOUNTING

(75) Inventors: Pawel Kubinski, Chotomow (PL); Sebastian Schreiber, Berlin (DE); Bartlomiej Sokolowski, Piotrkow Trybunalksi (PL)

(73) Assignee: CCS Technology, Inc., Wilmington, DE (US)

( * ) Notice: Subject to any disclaimer, the term of this patent is extended or adjusted under 35 U.S.C. 154(b) by 97 days.

(21) Appl. No.: 13/375,573

(22) Filed: Dec. 1, 2011
(Under 37 CFR 1.47)

(65) Prior Publication Data
US 2012/0281959 A1 Nov. 8, 2012

Related U.S. Application Data
(63) Continuation of application No. PCT/US2010/036343, filed on May 27, 2010.

(30) Foreign Application Priority Data
Jun. 3, 2009 (EP) .................................. 09007335

(51) Int. Cl.
*G02B 6/00* (2006.01)
(52) U.S. Cl.
USPC ........................................................ 385/139
(58) Field of Classification Search
USPC ........................................................ 385/139
See application file for complete search history.

(56) References Cited

U.S. PATENT DOCUMENTS

| | | | |
|---|---|---|---|
| 4,066,317 A | 1/1978 | Bierenfeld et al. | 339/91 |
| 5,625,737 A | 4/1997 | Saito | 385/137 |
| 6,227,719 B1 | 5/2001 | Aoki et al. | 385/59 |
| 7,302,152 B2 * | 11/2007 | Luther et al. | 385/135 |
| 7,330,629 B2 * | 2/2008 | Cooke et al. | 385/136 |

(Continued)

FOREIGN PATENT DOCUMENTS

| | | | |
|---|---|---|---|
| DE | 9316137 U1 | 12/1993 | G02B 6/36 |
| EP | 1092996 A2 | 4/2001 | G02B 6/38 |
| WO | WO02/16989 A1 | 2/2002 | G02B 6/38 |

OTHER PUBLICATIONS

European Patent Office Search Report, Application No. 09007335.4-2216, Dec. 10, 2009, 7 pages.

(Continued)

*Primary Examiner* — Uyen Chau N Le
*Assistant Examiner* — Hoang Tran

(57) ABSTRACT

A device for receiving a subassembly, in particular a furcation plug or a furcation adaptor, assigned to an optical fiber cable and for fastening the subassembly received on the device to a mounting, in particular to a wall of a distribution panel or distribution cabinet, via the device, with a bar-shaped basic body, there being formed on a topside of the basic body a guide element for receiving the subassembly assigned to the optical fiber cable, there being formed on an underside, in the region of mutually opposite ends of the basic body, anchoring elements, via which the device can be introduced into recesses of the mounting, whereby the guide element for receiving the subassembly comprises at least two protrusions forming latching elements which engage with shoulders or recesses formed in the subassembly to be received by the guide element when the subassembly is pushed into said guide element.

5 Claims, 3 Drawing Sheets

(56) References Cited

U.S. PATENT DOCUMENTS

| | | | |
|---|---|---|---|
| 8,285,104 B2 * | 10/2012 | Davis et al. | 385/135 |
| 2007/0047897 A1 | 3/2007 | Cooke et al. | 385/136 |
| 2008/0019646 A1 | 1/2008 | DeJong et al. | 385/99 |

OTHER PUBLICATIONS

Patent Cooperation Treaty International Search Report, Application No. PCT/US10/36343, Jul. 28, 2010, 3 pages.

* cited by examiner

PRIOR ART    Fig. 1

DEVICE FOR RECEIVING A SUBASSEMBLY ASSIGNED TO AN OPTICAL FIBRE CABLE AND FOR FASTENING THE SAME TO A MOUNTING

RELATED APPLICATIONS

This application is a continuation of International Application No. PCT/US10/36343 filed May 27, 2010, which claims the benefit of priority to European Application No. 09007335.4, filed Jun. 3, 2009, both applications being incorporated herein by reference.

BACKGROUND

The present application relates to a device for receiving a subassembly, in particular a furcation plug or a furcation adaptor, assigned to an optical fibre cable and for fastening the subassembly received on the device to a mounting via the device.

FIG. 1 shows a device, known from the prior art, for receiving a subassembly, in particular a furcation plug or a furcation adaptor, assigned to an optical fibre cable and for fastening the subassembly received on the device to a mounting, particularly to a wall of a distribution panel or distribution cabinet via the device. The device 10, shown in a side view in FIG. 1, has a bar-shaped basic body 11 with a topside 12 and with an underside 13. On the topside 12 of the basic body 11 there is positioned a guide element being designed as guide rail 14, which extends approximately parallel to the bar-shaped basic body 11 and onto which, to receive the subassembly assigned to the optical fibre cable, the respective subassembly can be pushed in such a way that, when the subassembly is pushed onto the guide rail 14, the guide rail 14 engages into a groove formed on the subassembly to be received. A subassembly to be received on the device 10 is pushed onto the guide rail 14 in the direction of the arrow 15. The arrow 15 therefore indicates the direction in which a subassembly to be received by the device 10 and assigned to an optical fibre cable is pushed onto the guide rail 14.

In the region of the underside 13 of the bar-shaped basic body 11, anchoring elements 16 and 17 are formed in the region of mutually opposite ends of the basic body 11.

At the rear end of the basic body 11, as seen in the push-on direction 15, the anchoring element 16 is formed on the underside 13 of the basic body 11. At the front end of the basic body 11, as seen in the push-on direction 15, the anchoring element 17 is formed on the underside 13 of the basic body 11. Via the two anchoring elements 16, 17 the device 10 is able to be introduced into recesses of a mounting, to which the device 10, together with the subassembly received by it and assigned to the optical fibre cable, is to be fastened.

According to FIG. 1, the anchoring element 17 positioned at the front end, as seen in the push-on direction 15, of the bar-shaped basic body 11 is designed as an integral part of a stop 18 of U-shaped cross section, this stop 18 being effective in the push-on direction 15 and therefore, in the push-on direction 15, forming a stop for a subassembly to be pushed onto the guide rail 14.

The device 10 as illustrated in FIG. 1 is known from U.S. Pat. No. 7,330,629 B2.

SUMMARY

Against this background, a novel device for receiving a subassembly assigned to an optical fibre cable and for fastening the subassembly received on the device to a mounting via the device is provided allowing easy installation of the subassembly to the device.

A novel device for receiving a subassembly assigned to an optical fibre cable and for fastening the subassembly received on the device to a mounting via the device is defined in claim 1. According to claim 1 the guide element for receiving the subassembly comprises at least two protrusions forming latching elements which engage with shoulders or recesses formed in the subassembly to be received by the guide element when the subassembly is pushed into said guide element. The novel device for receiving a subassembly assigned to an optical fibre cable and for fastening the subassembly received on the device to a mounting via the device allows easy installation of the subassembly to the device.

It is to be understood that both the foregoing general description and the following detailed description present embodiments, and are intended to provide an overview or framework for understanding the nature and character of the same. The accompanying drawings are included to provide a further understanding of the disclosure, and are incorporated into and constitute a part of this specification. The drawings illustrate various embodiments, and together with the description serve to explain the principles and operation of the same.

BRIEF DESCRIPTION OF THE FIGURES

Preferred embodiments of a device for receiving a subassembly assigned to an optical fibre cable and for fastening the subassembly received on the device to a mounting via the device are given in the dependent claims and the description below. Exemplary embodiments will be explained in more detail with reference to the drawing, in which:

DESCRIPTION

Reference will now be made in detail to the preferred embodiments of the disclosure, examples of which are illustrated in the accompanying drawings. Whenever possible, like reference numbers will be used to refer to like components or parts.

Figure 1:
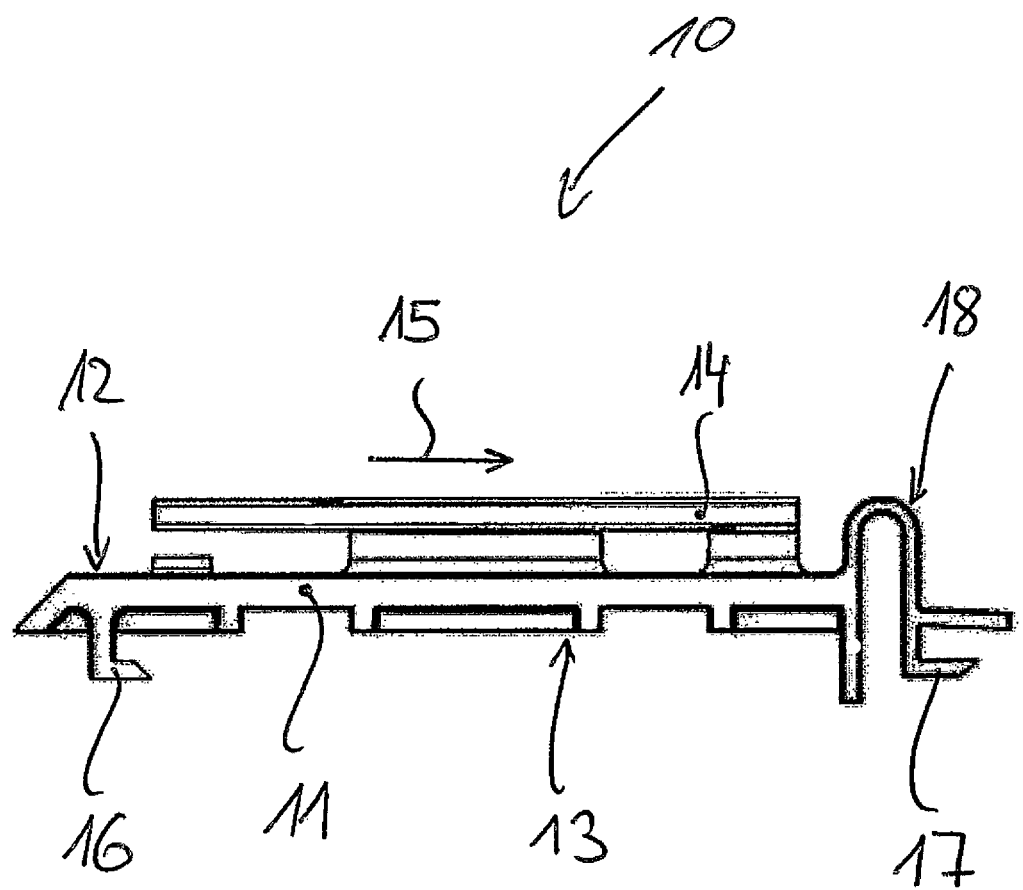
FIG. 1 shows a device, known from the prior art, for receiving a subassembly assigned to an optical fibre cable and for fastening the subassembly received on the device to a mounting, in a side view.
Figure 2:
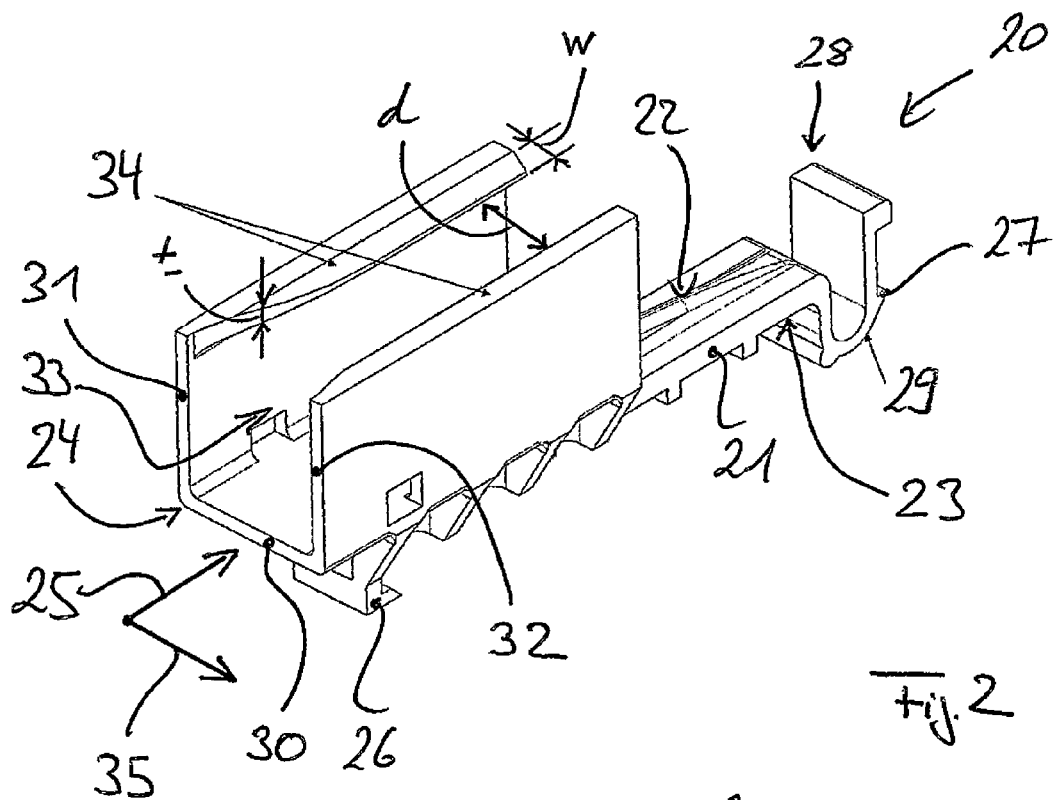
FIG. 2 shows a novel device for receiving a subassembly assigned to an optical fibre cable and for fastening the subassembly received on the device to a mounting, in a first perspective view.
Figure 3:
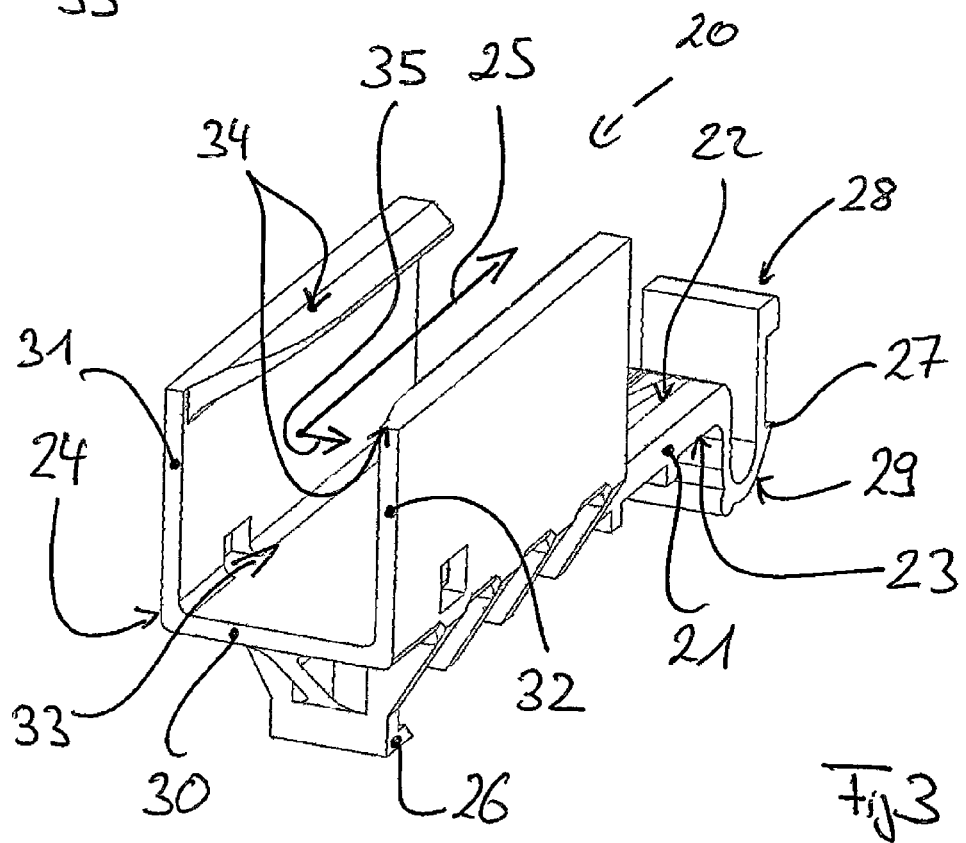
FIG. 3 shows the device of FIG. 2 in a second perspective view.

FIGS. 2 and 3 show different views of a preferred embodiment of a device 20 for receiving a subassembly, such as, for example, a furcation plug or a furcation adaptor, assigned to an optical fibre cable and for fastening the subassembly received on the device 20 to a mounting, such as, for example, a wall of a distribution panel or distribution cabinet, via the device.

The device 20 according to FIGS. 2, 3 has a bar-shaped basic body 21 with a topside 22 and with an underside 23. On the topside 22 of the bar-shaped basic body 21, a guide element 24 is formed which is designed to receive a subassembly, such as a furcation plug or a furcation adaptor, assigned to an optical fibre cable. Such a subassembly can be pushed into the guide element 24 in the direction of the arrow 25.

At mutually opposite ends of the bar-shaped basic body 21, anchoring elements 26 and 27 are formed, via which the device 20 can be fastened to a mounting, in particular a wall of a distribution panel or distribution cabinet.

The device 20 can be fastened to a mounting in such a way that the anchoring elements 26, 27 can be introduced in a barb-like manner into recesses of the mountings and thus project into the recesses of the mounting. The anchoring element 27 positioned at the front end of the bar-shaped basic body 23, as seen in the push-in direction 25, is formed as part of an element 28 having U-shaped cross section.

The element 28 being U-shaped is designed in such a way that a closed portion 29 of the latter is formed on the underside 23 of the bar-shaped basic body 21 or projects with respect to the underside 23 of the bar-shaped basic body 21. When the device 20 together with a subassembly received on the latter and assigned to the optical fibre cable, is to be fastened to a mounting, the element 28 being U-shaped engages with the closed portion 29 into a recess of the mounting. When a force is exerted on the element 28 in the push-in direction 25 the element 28 is subjected to a deformation in a way that the bar-shaped body 21 ultimately arches and the anchoring elements 26, 27 of the latter are clamped in the region of the recesses of the mountings. There is then no risk that the anchoring elements 26, 27 jump out of the recesses of the mountings inadvertently and the device 20 comes loose from the mounting inadvertently.

The guide element 24 of the device 20 comprises a bottom wall 30 formed by said bar-shaped basic body 21 and two opposite side walls 31, 32 running perpendicular to said bottom wall 21. Said walls 30, 31 and 32 of the guide element 24 define an interior 33 of the guide element 24. A subassembly, such as a furcation plug or a furcation adaptor, assigned to an optical fibre cable can be pushed into the interior 33 of guide element 24 in the push-in direction 25.

The guide element 24 for receiving the subassembly comprises at least two protrusions 34 forming latching elements which engage with shoulders or recesses formed in the subassembly to be received by the guide element 24 when the subassembly is pushed into said guide element 24.

Figure 4:
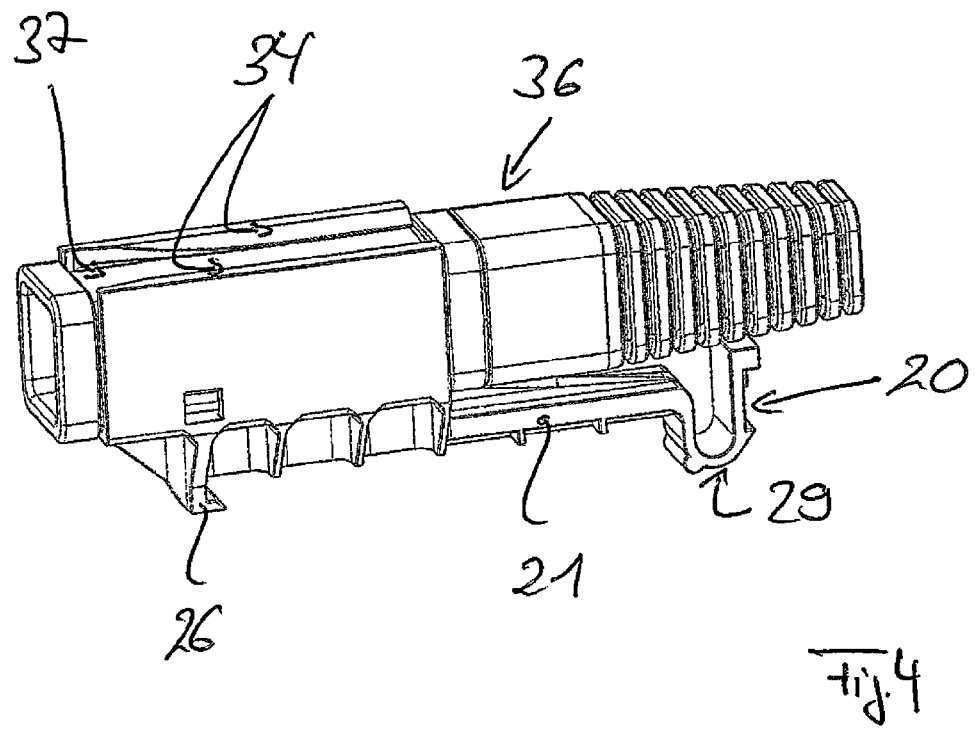
FIG. 4 shows the device of FIGS. 2, 3 together with a subassembly received by the device in a first perspective view.
Figure 5:
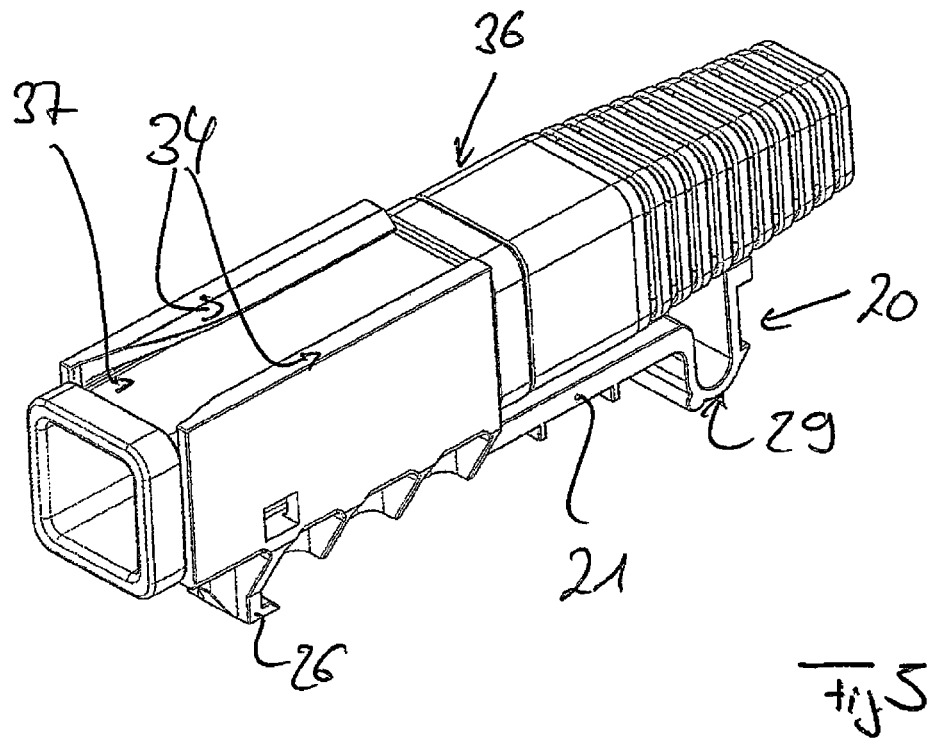
FIG. 5 shows the device of FIGS. 2, 3 together with the subassembly received by the device in a second perspective view.

FIGS. 4 and 5 both show the device 20 together with a subassembly, namely a furcation plug 36, received by the device 20. The protrusions 34 forming said latching elements which engage with shoulders 37 formed in the furcation plug 36.

Said protrusions 34 forming said latching elements are assigned to the opposite side walls 31, 32 of the guide element 24 in a way that they extend into said interior 33 of said guide element 24 so that they engage into said shoulders or recesses formed in side walls of the subassembly to be received by the interior of said guide element 24.

The protrusions 34 forming the latching elements run in parallel to said bar-shaped basic body 21, whereby the distance d (see FIG. 2) between the protrusions 34 assigned to the opposite side walls 31, 32 of the guide element 24 is decreasing as seen in the push-in direction 25 of the subassembly into the interior of said guide element 24. At the rear end of the basic body 21, as seen in the push-on direction 25, the distance d between the protrusions 34 is larger than at the front end of the basic body 21. The protrusions 34 from a lead-in taper helping to start the insertion of the subassembly in the device 20. In the shown embodiment, the distance d between the protrusions 34 decreases only in a portion of the protrusions 34, namely in a rear end portion, as seen in the push-on direction 25, in which the protrusions 34 from said lead-in taper. The width w (see FIG. 2) of said protrusions 34 assigned to said opposite side walls 31, 32 is increasing as seen in the push-in direction 25 of the subassembly into the interior of said guide element 25. Said increase of the width w of the protrusions 34 corresponds to said decrease of the distance d between the protrusions 34.

The thickness t (see FIG. 2) of the protrusions 34 assigned to said opposite side walls 31, 32 is decreasing toward the interior 33 of the guide element 24 as seen in a direction 35 running perpendicular to the push-in direction 25 of the subassembly into the interior 33 of said guide element 24.

When a subassembly, such as a furcation plug or a furcation adaptor, assigned to an optical fibre cable is inserted or pushed in the interior 33 of the guide element 24 in the push-in direction 25, the protrusions 34 forming the latching elements flex outwardly to receive the subassembly and then the protrusions 34 spring back and engage with the shoulders or recesses formed in the side walls of the subassembly in order to secure the subassembly within the device 20. The protrusions 34 are resiliently attached cantilever arms. With an increased insertion of the subassembly into the interior 33 of the guide element 24 the clamping force provided by protrusions 34 having the distance d, the width w and the thickness t to the subassembly is increasing. This allows an easy, durable and safe installation of the subassembly to the device 20.

Many modifications and other embodiments of the disclosure set forth herein will come to mind to one skilled in the art to which the invention pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. It is intended that the present disclosure cover the modifications and variations of this invention provided they come within the scope of the appended claims and their equivalents. Although specific terms are employed herein, they are used in a generic and descriptive sense only and not for purposes of limitation.

We claim:

1. A device for receiving a subassembly having a furcation plug or a furcation adaptor being a portion of an optical fibre cable and for fastening the subassembly received on the device to a mounting, via the device, the device having a bar-shaped basic body, there being formed on a topside of the basic body a guide element for receiving the subassembly, there being formed on an underside, in the region of mutually opposite ends of the basic body, anchoring elements, via which the device can be introduced into recesses of the mounting, wherein the guide element for receiving the subassembly comprises at least two protrusions forming latching elements which engage with shoulders or recesses formed in the subassembly to be received by the guide element when the subassembly is pushed into the guide element, wherein the protrusions forming the latching elements run in parallel to the bar-shaped basic body, whereby the distance between the protrusions assigned to the opposite side walls is decreasing as seen in the push-in direction of the subassembly into the interior of the guide element.

2. The device according to claim 1, wherein the guide element comprises a bottom wall and two opposite side walls running perpendicular to the bottom wall, the walls defining an interior of the guide element, whereby the at least two protrusions forming the latching elements are assigned to the opposite side walls in a way that they extend into the interior of the guide element so that they engage into the shoulders or recesses formed in side walls of the subassembly to be received by the interior of the guide element.

3. The device according to claim 1, wherein the protrusions forming latching elements run in parallel to the bar-shaped basic body, whereby the width of the protrusions assigned to the opposite side walls is increasing as seen in the push-in direction of the subassembly into the interior of the guide element.

4. The device according claim 1, wherein the anchoring element, which is assigned to a front end of the basic body as seen in the push-in direction of the subassembly into the interior of the guide element, is an integral part of an element being U-shaped, whereby the element is designed in such a way that a closed portion of the U-shaped element on the underside of the basic body projects with respect to the latter, in such a way that, when the subassembly received by the device is fastened to the mounting, the closed portion can be introduced into a recess of the mounting.

5. A device for receiving a subassembly having a furcation plug or a furcation adaptor being a portion of an optical fibre cable and for fastening the subassembly received on the device to a mounting, via the device, the device having a bar-shaped basic body, there being formed on a topside of the basic body a guide element for receiving the subassembly, there being formed on an underside, in the region of mutually opposite ends of the basic body, anchoring elements, via which the device can be introduced into recesses of the mounting, wherein the guide element for receiving the subassembly comprises at least two protrusions forming latching elements which engage with shoulders or recesses formed in the subassembly to be received by the guide element when the subassembly is pushed into the guide element, wherein the protrusions forming latching elements run in parallel to the bar-shaped basic body, whereby the thickness of the protrusions assigned to the opposite side walls is decreasing as seen perpendicular to the push-in direction of the subassembly into the interior of the guide element.

* * * * *